(12) United States Patent
Diana et al.

(10) Patent No.: US 10,989,857 B2
(45) Date of Patent: Apr. 27, 2021

(54) SHAPING INPUT SURFACES OF LED LIGHT-GUIDES FOR INCREASED LIGHT EXTRACTION EFFICIENCY

(71) Applicant: Lumileds LLC, San Jose, CA (US)

(72) Inventors: Frederic Stephane Diana, Santa Clara, CA (US); Jeroen Den Breejen, San Jose, CA (US); Gregory Donald Guth, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/618,049

(22) PCT Filed: May 30, 2018

(86) PCT No.: PCT/US2018/034997
§ 371 (c)(1),
(2) Date: Nov. 27, 2019

(87) PCT Pub. No.: WO2018/222634
PCT Pub. Date: Dec. 6, 2018

(65) Prior Publication Data
US 2020/0124783 A1    Apr. 23, 2020

Related U.S. Application Data

(63) Continuation of application No. 15/610,245, filed on May 31, 2017, now Pat. No. 10,809,436.

(51) Int. Cl.
*G02B 6/00* (2006.01)
*F21V 8/00* (2006.01)

(52) U.S. Cl.
CPC ........... *G02B 6/002* (2013.01); *G02B 6/0036* (2013.01); *G02B 6/0045* (2013.01);
(Continued)

(58) Field of Classification Search
CPC .... G02B 6/002; G02B 6/0036; G02B 6/0045; G02B 6/0051; G02B 6/0065;
(Continued)

(56) References Cited

U.S. PATENT DOCUMENTS

| | | |
|---|---|---|
| 2002/0141174 A1 | 10/2002 | Parker et al. |
| 2004/0114068 A1 | 6/2004 | Yu et al. |

(Continued)

FOREIGN PATENT DOCUMENTS

WO    WO-2018222634 A1    12/2018

OTHER PUBLICATIONS

"U.S. Appl. No. 15/610,245, Advisory Action dated Jun. 17, 2019", 3 pgs.

(Continued)

*Primary Examiner* — Jerry M Blevins
(74) *Attorney, Agent, or Firm* — Schwegman Lundberg & Woessner, P.A.

(57) ABSTRACT

A method, apparatus, and system are disclosed for increasing light extraction efficiency in a light guide optical system. The light guide optical system may comprise a light emitting source. The light emitting source may be, for example, a light-emitting diode (LED) or plurality of LEDS. The light guide optical system may also comprise a light guide plate (LGP). The LGP may include light extraction features located on surfaces of the LGP. The LGP may also include a shaped injection surface on an input surface of the LGP. The shaped injection surface may be angled to deviate near-parallel light emitted from the LED to enable the near-parallel light emitted from the LED to be extracted from the LGP via the light extraction features. The shaped injection surface may be a split edge (i.e., a V-groove) or a curved edge.

20 Claims, 18 Drawing Sheets

(52) U.S. Cl.
CPC ......... *G02B 6/0051* (2013.01); *G02B 6/0065* (2013.01); *F21V 2200/20* (2015.01); *G02B 6/0035* (2013.01); *G02B 6/0073* (2013.01); *G02B 6/0091* (2013.01)

(58) Field of Classification Search
CPC .. G02B 6/0035; G02B 6/0073; G02B 6/0091; F21V 2200/20
USPC ......................................................... 385/33
See application file for complete search history.

(56) References Cited

U.S. PATENT DOCUMENTS

| | | |
|---|---|---|
| 2006/0291244 A1 | 12/2006 | Yang et al. |
| 2008/0137373 A1 | 6/2008 | Li |
| 2011/0128471 A1 | 6/2011 | Suckling et al. |
| 2013/0003408 A1 | 1/2013 | Hong et al. |
| 2015/0160395 A1* | 6/2015 | Sahlhoff .............. G02B 6/0016 362/611 |
| 2015/0177439 A1 | 6/2015 | Durkee et al. |
| 2015/0323724 A1 | 11/2015 | Shinohara et al. |
| 2017/0371086 A1* | 12/2017 | Qi ...................... G02B 6/0016 |
| 2018/0348420 A1 | 12/2018 | Diana et al. |

OTHER PUBLICATIONS

"U.S. Appl. No. 15/610,245, Final Office Action dated Apr. 8, 2019", 12 pgs.
"U.S. Appl. No. 15/610,245, Non Final Office Action dated Jul. 25, 2019", 14 pgs.
"U.S. Appl. No. 15/610,245, Non Final Office Action dated Oct. 17, 2018", 12 pgs.
"U.S. Appl. No. 15/610,245, Preliminary Amendment filed May 30, 2018", 8 pgs.
"U.S. Appl. No. 15/610,245, Response filed Jan. 16, 2019 to Non Final Office Action dated Oct. 17, 2018", 11 pgs.
"U.S. Appl. No. 15/610,245, Response filed Jun. 4, 2019 to Final Office Action dated Apr. 8, 2019", 11 pgs.
"U.S. Appl. No. 15/610,245, Response filed Jul. 1, 2019 to Advisory Action dated Jun. 17, 2019", 11 pgs.
"U.S. Appl. No. 15/610,245, Response filed Oct. 24, 2019 to Non Final Office Action dated Jul. 25, 2019", 12 pgs.
"International Application Serial No. PCT/US2018/034997, International Search Report dated Aug. 10, 2018", 3 pgs.
"International Application Serial No. PCT/US2018/034997, Written Opinion dated Aug. 10, 2018", 7 pgs.
"Chinese Application Serial No. 201890001049.0, Notification to Make Rectification dated Sep. 20, 2020", (w/ English Translation), 4 pgs.
"Chinese Application Serial No. 201890001049.0, Office Action dated Jul. 14, 2020", (w/ English Translation), 6 pgs.
"Chinese Application Serial No. 201890001049.0, Response filed Sep. 14, 2020 to Office Action dated Jul. 14, 2020", (w/ English Translation), 21 pgs.
"Chinese Application Serial No. 201890001049.0, Response filed Nov. 4, 2020 to Notification to Make Rectification dated Sep. 30, 2020", (w/ English Translation), 20 pgs.

\* cited by examiner

SHAPING INPUT SURFACES OF LED LIGHT-GUIDES FOR INCREASED LIGHT EXTRACTION EFFICIENCY

This application is a U.S. National Stage Filing under 35 U.S.C. 371 from International Application No. PCT/US2018/034997, filed May 30, 2018, published as WO 2018/222634 on Dec. 6, 2018, which is a continuation of U.S. patent application Ser. No. 15/610,245, filed May 31, 2017, each of which is incorporated herein by reference in its entirety.

FIELD OF INVENTION

This invention relates to the field of light-guide optics-based lighting applications using light-emitting diode (LED) sources.

BACKGROUND

Light-emitting diodes (LEDs) are today often used in systems that include light-guide optics. Such optics are used to re-direct the light of the LEDs into more desired spatial and angular distributions. LEDs typically emit light in a Lambertian angular light distribution. When light is emitted in a Lambertian angular light distribution, it is emitted substantially equally in all upper-half-sphere directions. As a result of the emission of light in a Lambertian angular light distribution, a significant amount of light propagates in directions near to the normal of the emitting surface of the LEDs (i.e., at low angles of propagation, close to 0 degrees). When these light rays are impinging onto conventional light-guide optics such as light guide plates (LGPs) that may be flat and parallel to the emitting surfaces of the LEDs, they are minimally perturbed by these surfaces. For example, the transmission angle~incident angle/1.4 for low-angle rays propagating from air into glass or plastic. As a result, when these light rays are impinging onto conventional light-guide optics, they are deviated into even lower-angle directions (i.e., directions close to parallel to the main light-guide surfaces). As a result, most of these light rays traveling through the light-guide optic do not interact with the guiding surfaces or interact at only low frequencies and therefore can only be weakly mixed within the light-guide and can only be weakly out-coupled.

SUMMARY

A method, apparatus, and system are disclosed for increasing light extraction efficiency in a light guide optical system. The light guide optical system may comprise a light emitting source. The light emitting source may be, for example, a light-emitting diode (LED) or plurality of LEDs. The light guide optical system may also comprise a light guide plate (LGP). The LGP may include light extraction features located on surfaces of the LGP. The LGP may also include a shaped injection surface on an input surface of the LGP. The shaped injection surface may be angled to deviate near-parallel light emitted from the LED to enable this light to be extracted from the LGP via its light extraction features. The shaped LGP light-injection surface may be a split edge (i.e., a V-groove) or a curved edge.

In another example embodiment, an angular distribution of a ray set of LEDs used in the light guide optical system may be determined. A shape of an injection surface of an LGP used in the light guide optical system may then be determined based on the angular distribution of the ray set of the LEDs. The determined shape of the injection surface of the LGP may then be applied, wherein the applying, for example, may include using a manufacturing process that includes using a drill to create such shapes in the relevant surfaces of the LGP.

DETAILED DESCRIPTION

The embodiments described herein are directed to achieving improved light extraction efficiency in light guide optical systems. The light emitting sources used in the embodiments described herein may be any light emitting source such as a semiconductor light-emitting device including but not limited to a light emitting diode (LED), resonant cavity light emitting diode (RCLED), vertical cavity laser diodes (VCSEL), and an edge emitting lasers. The light emitting sources used in the embodiments described herein may include LEDs that emit blue light formed from binary, ternary, and quaternary alloys of gallium, aluminum, indium, and nitrogen, also referred to as III nitride materials. The light emitting sources used in the embodiments described herein may also include LEDs that emit red light formed from binary, ternary, and quaternary alloys of gallium, aluminum, indium, arsenic, and phosphorus. The method is also applicable to UV or IR LEDs sources.

The light emitting sources used in the embodiments described herein may be fabricated by epitaxially growing a stack of semiconductor layers of different compositions and dopant concentrations on a substrate such as, for example, a Gallium arsenide (GaAs) substrate, sapphire substrate, silicon carbide substrate, III-nitride substrate, III-phosphide substrate, III-arsenide substrate, silicon substrate, or other suitable substrate by metal-organic chemical vapor deposition (MOCVD), molecular beam epitaxy (MBE), or other epitaxial techniques. The stack of semiconductor layers may include one or more n-type layers doped with, for example, Si, formed over the substrate, one or more light emitting layers in an active region formed over the n-type layer or layers, and one or more p-type layers doped with, for example, Mg, formed over the active region. Electrical contacts may be formed on the n- and p-type regions.

The light guides, wave guides, and light guide plates (LGPs) used in the embodiments described herein may be manufactured using any transparent material at the wavelengths of the light sources considered in the system, for example glass, silicone, or a plastic or acrylic resin for visible light. These may be used in various indoor or outdoor lighting applications, lighting distribution applications, streetlights, and/or display devices. The terms LGP, light guide, and wave guide may be used interchangeably herein.

Figure 1:
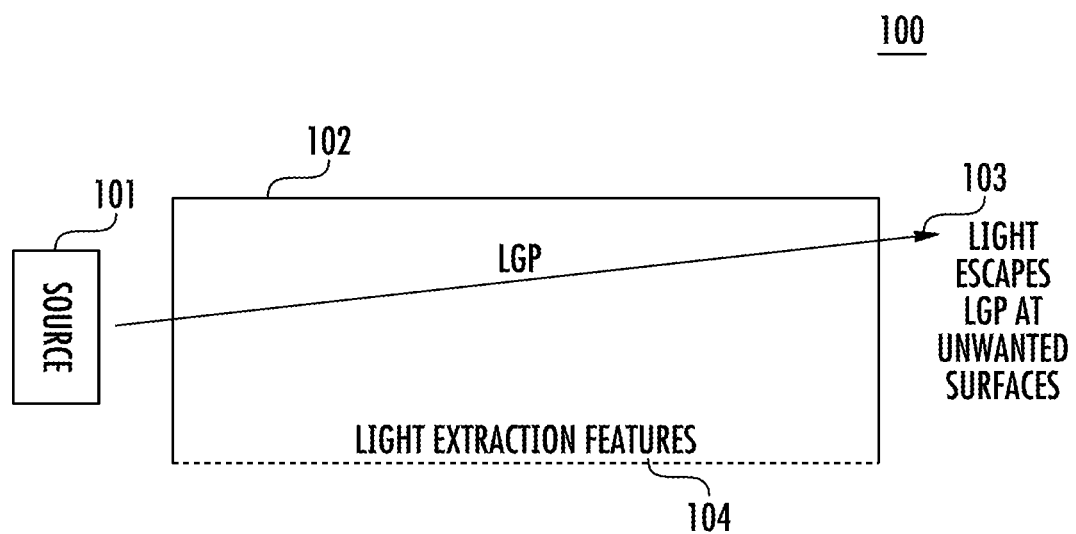
FIG. 1 is a diagram of an example light guide optical system.

FIG. 1 is a diagram of an example light guide optical system 100. In the example of FIG. 1, source 101 emits light 103 into a light guide such as LGP 102. LGP 102 may include light extraction features 104 including but not limited to dot patterns or textures that may be located on surfaces of LGP 102. As shown in the example of FIG. 1, some light 103 may escape LGP 102, which may be escaping unwanted surfaces of LGP 102. The light 103 that escapes LGP 102 may include low-angle total internal reflection (TIR) rays that do not interact frequently with the extraction features. The escaped light 103 may never hit the surfaces or extraction features of the LGP 102 or exit the opposite end of the LGP 102, and therefore escaped light 103 may translate directly into a loss of light.

Figure 2A:
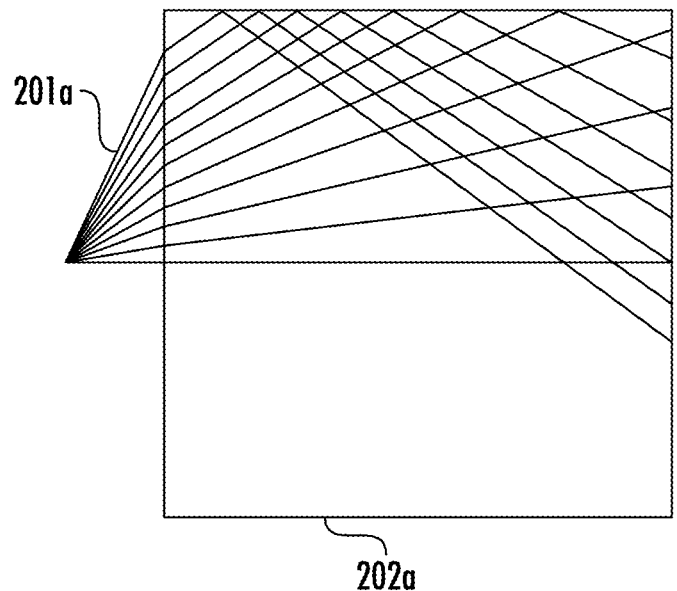
FIG. 2A is a diagram of another example light guide optical system.
Figure 2B:
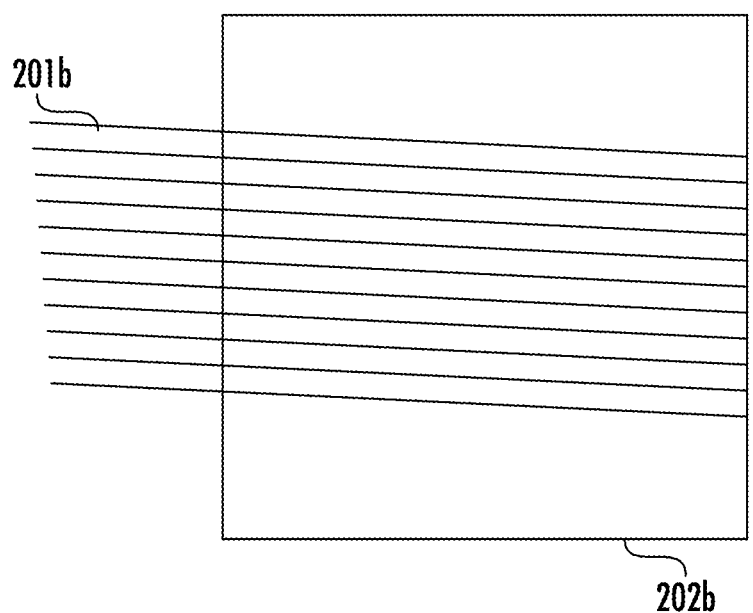
FIG. 2B is a diagram of another example light guide optical system.

FIGS. 2A-2B are diagrams of another example light guide optical system 200. As shown in FIG. 2A, light rays 201a traveling with low propagation angles in LGP 202a are not extracted and escape LGP 202a.

As shown in FIG. 2B, light rays 201b travel through LGP 202b they are either absorbed by the material of LGP 202b before they are extracted or are extracted at the opposite surfaces of LGP 202b where they may then be absorbed by other elements.

The systems shown in FIG. 1, FIG. 2A, and FIG. 2B experience diminished light extraction efficiency due to the problem described above in which light rays travel through the light-guide optic and/or do not interact with the guiding surfaces or interact at only low frequencies of the light-guide optic and therefore can only be weakly mixed within the light-guide and can only be weakly out-coupled. As shown in the examples of FIG. 1, FIG. 2A, and FIG. 2B, light rays may exit the LGP before they are extracted. Further, light rays may be extracted at the opposite surface of the LGP where they may then be absorbed by other elements. The embodiments described herein change the geometries of the LGP input surfaces with shapes tuned to LEDs in order to de-collimate LED light and reduce these undesired effects. As a result, the embodiments described herein improve light extraction efficiency and reduce the effect of light rays escaping a light guide.

Light extraction efficiency improvements may be achieved in the embodiments herein by changing the geometries of the LGP input surfaces by matching shapes of the injection surfaces of light guides to the angular light distribution of LEDs in order to meet various criteria including but not limited to:

One of the various criteria may be that light rays emitted by LEDs after crossing the light guide injection surface are directed into the light guide optic at angles sufficiently high as to induce a sufficiently high bouncing frequency of TIR of the light rays onto the guiding surfaces.

Another of the various criteria may be that after crossing the light guide injection surfaces, the TIR rays do not propagate in the light guide at excessively high angles such that they discontinue being TIR rays on the guiding surfaces but instead leak outside undesirably.

Another of the various criteria may be that the exact angle of the input surfaces or the specific shape of the input surface is tuned to avoid inducing angles that are too high for TIR rays in the light guide in order to optimize the spatial luminance uniformity of the light guide.

The optimal shape used in the embodiments described herein may depend on the distance of the LED to the LGP input surface.

The application of criteria such as the above may lead to specific shapes for the injection surfaces. Each LED or LED rows or arrays may have a mating shaped injection surface placed at edges of light guides or placed in rings, in slots, or in grooves. These specific shaped injection surfaces may apply to rectangular or more complex multifaceted light guides, cylindrical light guides, circular light guides, or curved light guides. This may also be applied to in-plane injection (direct-coupling) of light into light guides, not only to edge-lit light guides. The shapes used with the light guide input surfaces of the embodiments described herein are compatible with standard light guide manufacturing techniques.

In addition to reducing the effect of light rays escaping a light guide before they are extracted and the effect of light rays being extracted at the opposite surfaces where they are absorbed by other elements, the application of specific shapes for the injection surfaces may also reduce color point spatial non-uniformity of the light extracted by the light guide that is caused by the non-uniform color-over-angle of the light emitted by the LEDs. Typically, phosphor-converted white LEDs have higher correlated color temperature (CCT) (bluer shades of white) at low angles and have lower CCT (yellower shades of white) at high angles. This asymmetry may persist in the LGP optic as the lower-angle light (bluer light) is extracted less or is at lower angles than the higher-angle light (yellower). Accordingly, the embodiments described herein may allow a better mix of these different components of light within the LGP leading to not only improved color uniformity for the LGP spatial luminance but also improved color uniformity in the LGP output angular distribution. This improvement may be applied in display devices by including shapes used with light guide input surfaces in accordance with the embodiments described herein.

Figure 3:
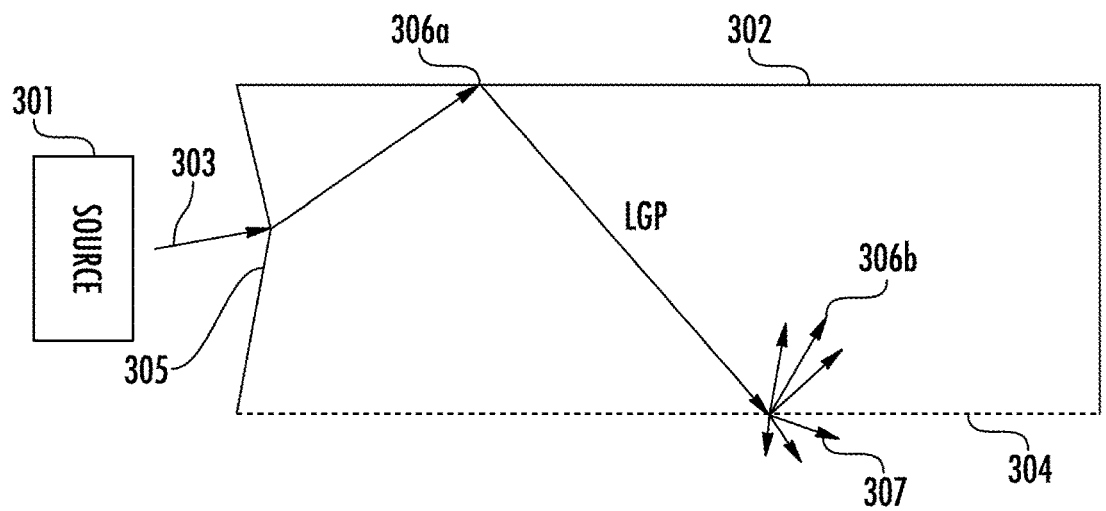
FIG. 3 is a diagram of an example light guide optical system.

FIG. 3 is a diagram of an example light guide optical system 300 that includes a split edge at the injection surface in accordance with one embodiment, which may be used in accordance with any of the embodiments described herein. In the example of FIG. 3, source 301 is a light emitting source such as an LED (or plurality of LEDs), which emits light 303 into a light guide such as LGP 302. LGP 302 may include light extraction features 304 including but not limited to dot patterns or textures that may be located on surfaces of LGP 302. As shown in the example of FIG. 3, LGP 302 may include a split edge at the injection surface 305 that is angled to deviate 306a, 306b near-parallel light and extract 307 the light. The split edge at the injection surface 305 may be shaped to match the angular light distribution of source 301 in order to meet the various criteria identified above in order to deviate near-parallel light emitted from source 301 and enable the near-parallel light emitted from source 301 to be extracted from LGP 302 via light extraction features 304.

Figure 4:
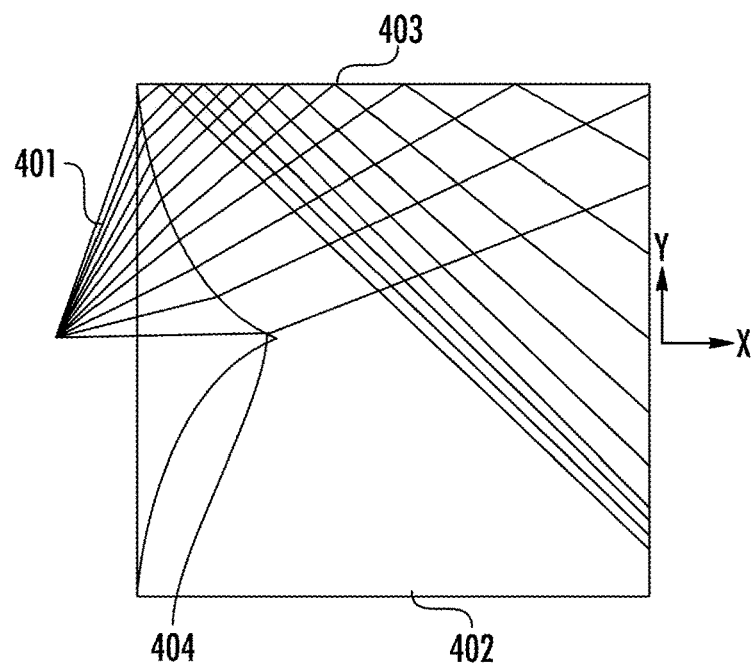
FIG. 4 is diagram of another view of the example light guide optical system that includes a split edge at the injection surface.

FIG. 4 is diagram of another view of the example light guide optical system 300 that includes a split edge at the injection surface 400. In the example of FIG. 4, light rays 401 traveling with low propagation angles may enter LGP 402 at the split edge at the injection surface 404 that is angled to deviate 403 light rays 401 allowing the light rays 401 to be extracted because they do not escape LGP 402. The split edge at the injection surface 404 may be shaped to match the angular light distribution of light rays 401 in order to meet the various criteria identified above in order to deviate near-parallel light emitted from light rays 401 and enable the near-parallel light emitted from light rays 401 to be extracted from LGP 402 via the light extraction features of LGP 402.

Figure 5:
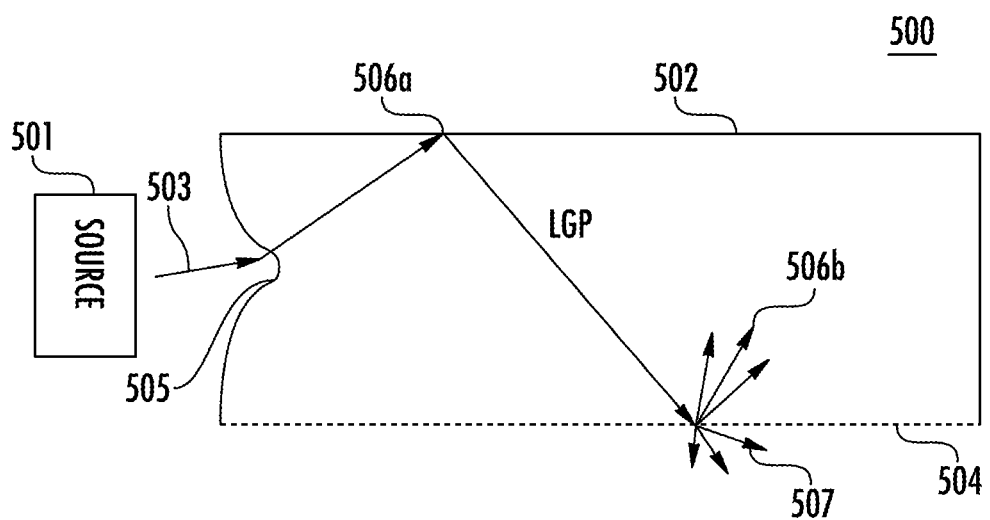
FIG. 5 is a diagram of an example light guide optical system that includes a curved shape injection surface.

FIG. 5 is a diagram of an example light guide optical system 500 that includes a curved shape injection surface in accordance with another embodiment, which may be used in accordance with any of the embodiments described herein. In the example of FIG. 5, source 501 is a light emitting source such as a LED (or plurality of LEDs), which emits light 503 into a light guide such as LGP 502. LGP 502 may include light extraction features 504 including but not limited to dot patterns or textures that may be located on surfaces of LGP 502. As shown in the example of FIG. 5, LGP 502 may include a curved shape injection surface 505 that may prevent high-angle light rays from leaking out by deviating 506a, 506b the light allowing the light to be extracted 507. The curved shape injection surface 505 may be curved to match the angular light distribution of source 501 in order to meet the various criteria identified above in order to deviate near-parallel light emitted from source 501 and enable the near-parallel light emitted from source 501 to be extracted from LGP 502 via light extraction features 504.

Figure 6A:
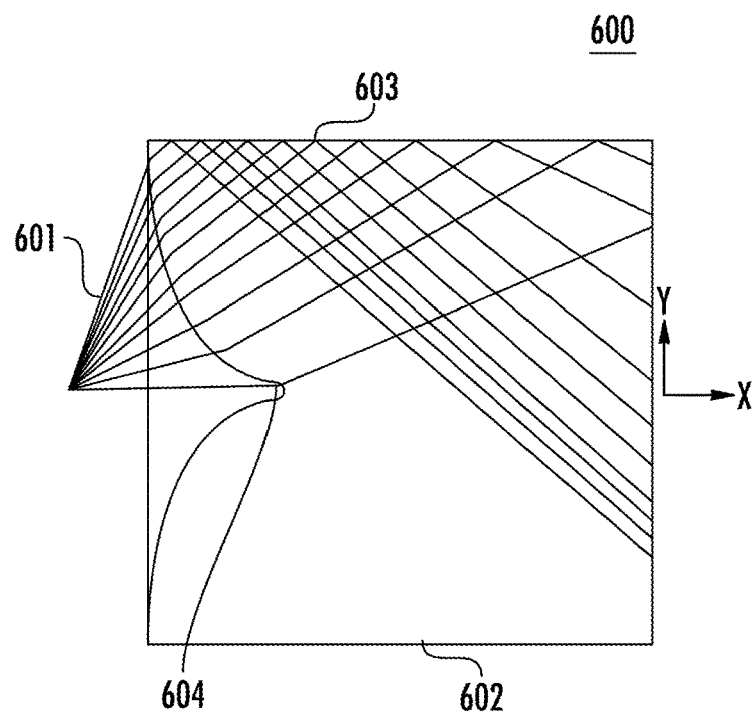
FIG. 6A is diagram of another view of the example light guide optical system that includes a curved shape injection surface.

FIG. 6A is diagram of another view of the example light guide optical system 500 that includes a curved shape injection surface 600. In the example of FIG. 6A, light rays 601 traveling with low propagation angles enter LGP 602 at the curved shape injection surface 604 that deviates 603 light rays 601 allowing the light rays 601 to be extracted because they do not escape LGP 602. The curved shape injection surface 604 may be curved to match the angular light distribution of light rays 601 in order to meet the various criteria identified above in order to deviate near-parallel light emitted from light rays 601 and enable the near-parallel light emitted from light rays 601 to be extracted from LGP 602 via the light extraction features of LGP 602.

Figure 6B:
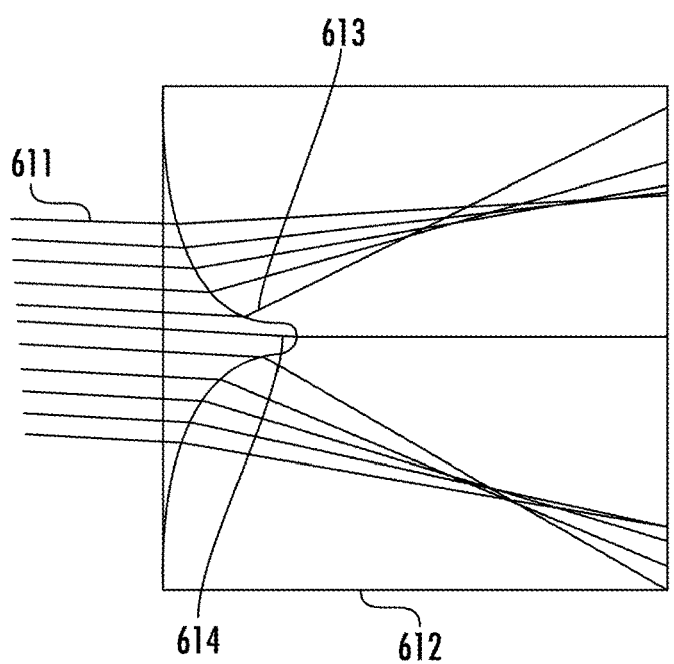
FIG. 6B is diagram of another view of the example light guide optical system that includes a curved shape injection surface.

FIG. 6B is diagram of another view of the example light guide optical system 500 that includes a curved shape injection surface. In the example of FIG. 6B, light rays 611 traveling at near-parallel angles enter LGP 612 at the curved shape injection surface 614 that deviates 613 light rays 611 allowing the light rays 611 to be extracted because they do not escape LGP 612. The curved shape injection surface 614 may be curved to match the angular light distribution of light rays 611 in order to meet the various criteria identified above in order to deviate near-parallel light emitted from light rays 611 and enable the near-parallel light emitted from light rays 611 to be extracted from LGP 612 via the light extraction features of LGP 612.

Figure 7:
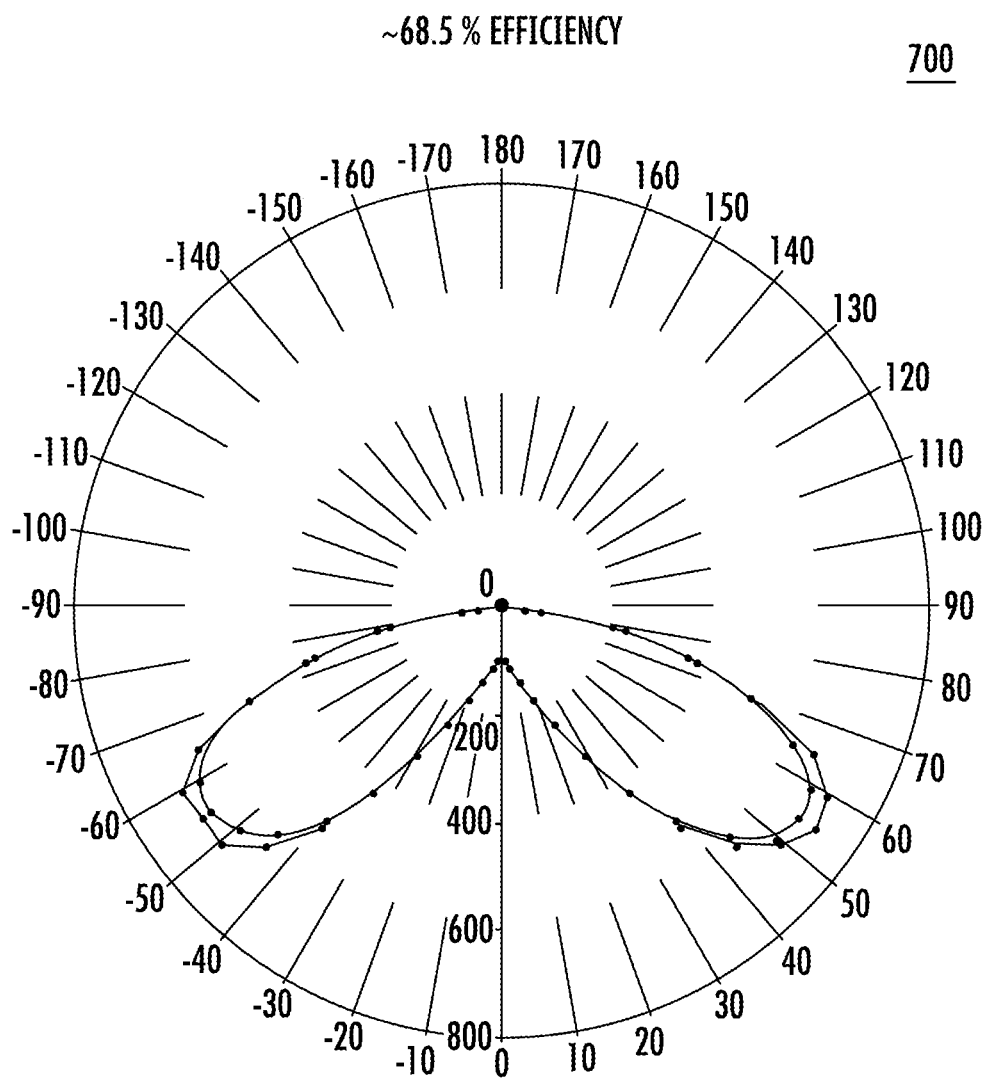
FIG. 7 is a diagram showing a light intensity and a light extraction efficiency.

FIG. 7 is a diagram 700 showing light intensity and a light extraction efficiency of approximately 68.5% when the LGP used in the light guide optical system uses flat edges on the LGP. In the example of FIG. 7, the total collected power is 2468.7 lumens (lm), the efficiency is 0.68574, and the maximum intensity is 729.17 candelas (cd).

Figure 8:
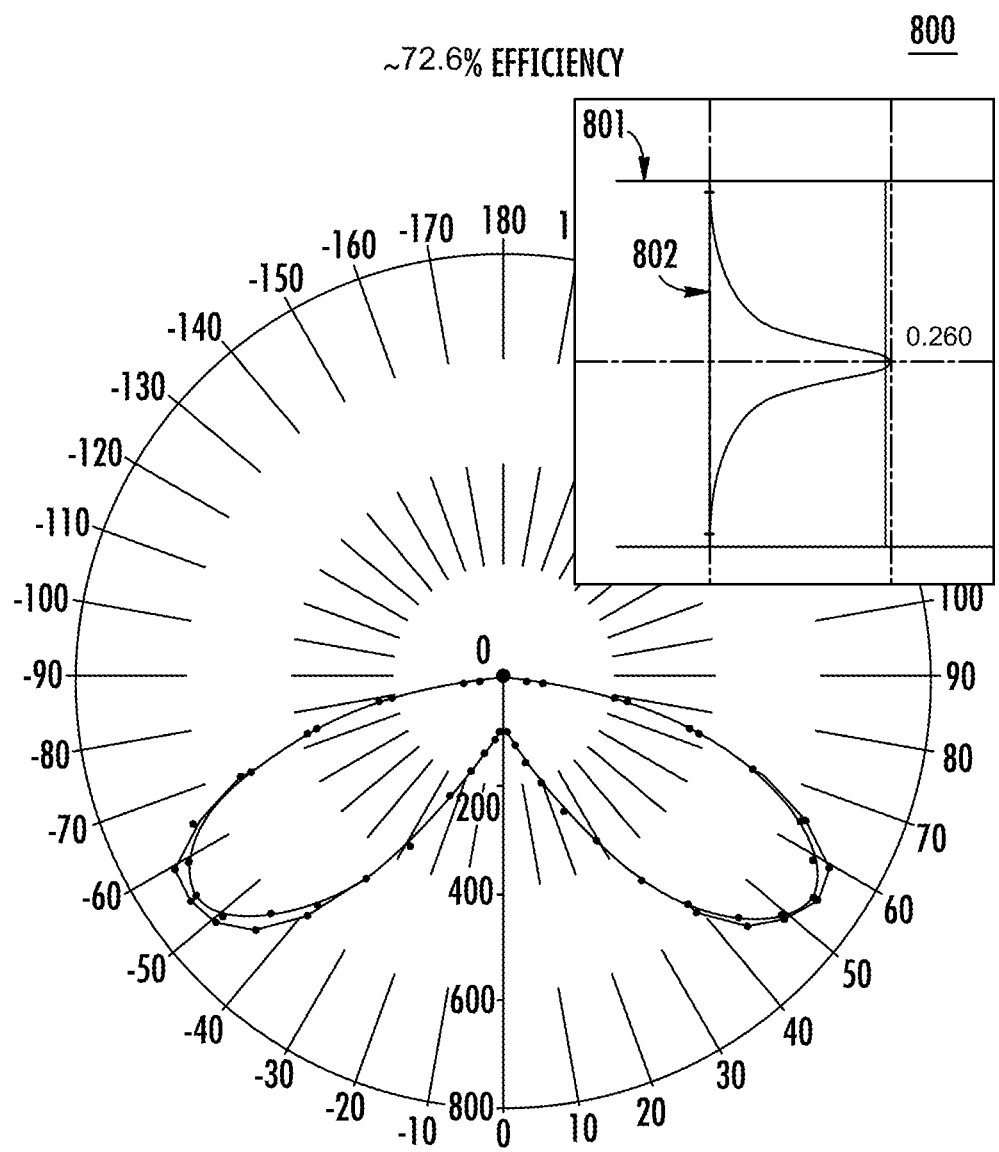
FIG. 8 is a diagram showing a light intensity and a light extraction efficiency when the LGP has light emission characteristics in accordance with a Lambertian curve.

FIG. 8 is a diagram 800 showing light intensity and a light extraction efficiency of approximately 72.6% when the LGP used in the light guide optical system uses LGP that has light emission characteristics in accordance with a Lambertian curve. In the example of FIG. 8, the total collected power is 2614.5 lm, the efficiency is 0.72625, and the maximum intensity is 742.82 cd. The example of FIG. 8 applies to a 6 mm LGP 801 that has a curved shape injection surface 802 with an opening measuring 0.260 mm.

Figure 9:
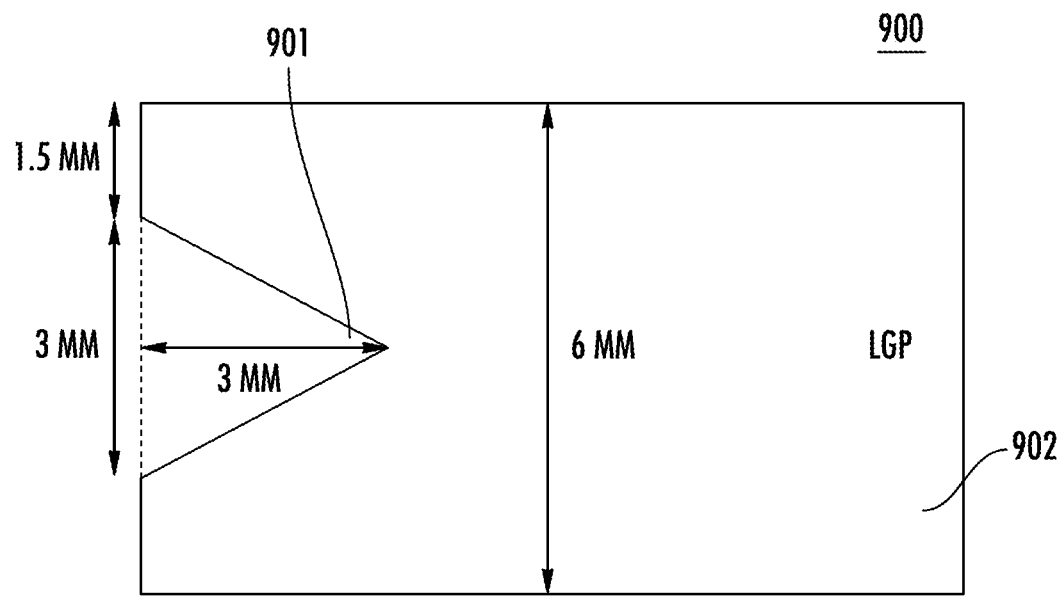
FIG. 9 is a diagram of another example light guide optical system.

FIG. 9 is a diagram of another example light guide optical system 900, which may be used in accordance with any of the embodiments described herein. In the example of FIG. 9, a light guide such as a LGP 902 is used at a thickness of 6 millimeters. In the example of FIG. 9, LGP 902 may include a split edge (which may also be referred to herein as a V-groove) at the injection surface 901 that is 3 millimeters from the injection surface 901 edge of LGP 902. The split edge is angled with a 3 millimeter wide base that begins 1.5 millimeters from the top edge. The size and shape of the split edge at the injection surface 901 may be matched to the angular light distribution of a light source in order to meet the various criteria identified above in order to deviate near-parallel light emitted from the light source and enable this near-parallel light to be extracted from LGP 902 via the light extraction features of LGP 902.

Figure 10:
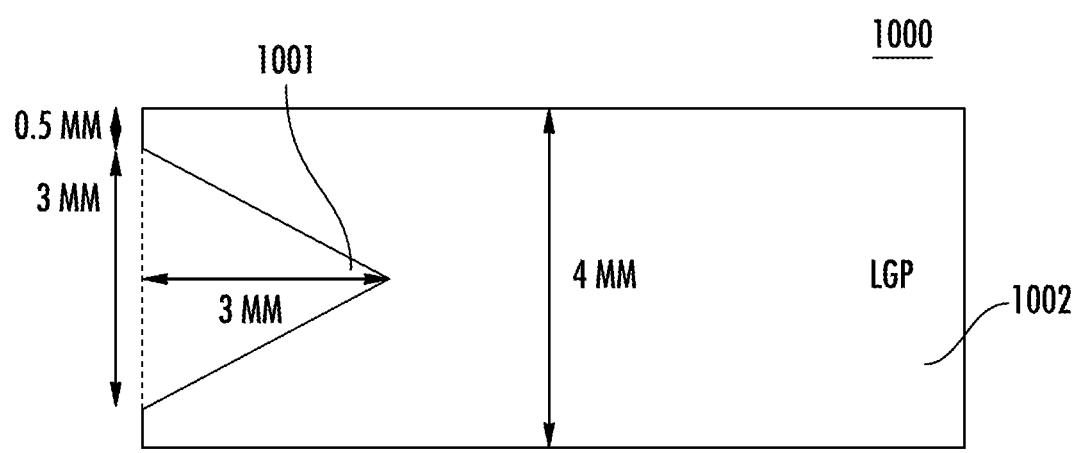
FIG. 10 is a diagram of another example light guide optical system with a split edge injection surface.

FIG. 10 is a diagram of another example light guide optical system 1000, which may be used in accordance with any of the embodiments described herein. In the example of FIG. 10, a light guide such as a LGP 1002 is used at a thickness of 4 millimeters. In the example of FIG. 10, LGP 1002 may include a split edge at the injection surface 1001 that is 3 millimeters from the injection surface 1001 edge of LGP 1002. The split edge is angled with a 3 millimeter wide base that begins 0.5 millimeters from the top edge. The size and shape of the split edge at the injection surface 1001 may be matched to the angular light distribution of a light source in order to meet the various criteria identified above in order to deviate near-parallel light emitted from the light source and enable this near-parallel light to be extracted from LGP 1002 via the light extraction features of LGP 1002.

Figure 11:
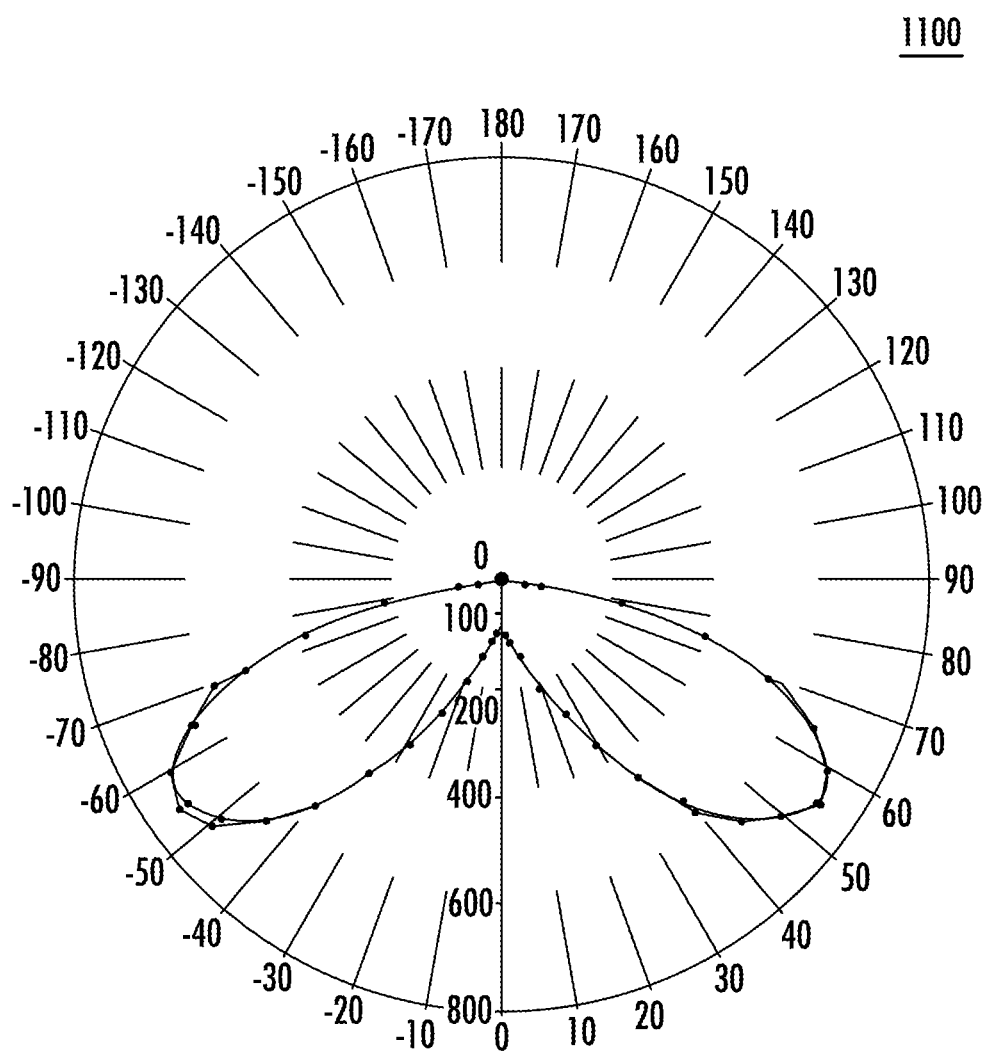
FIG. 11 is a diagram showing a light intensity and a light extraction efficiency when the LGP has a V-groove.

FIG. 11 is a diagram 1100 showing light intensity and a light extraction efficiency of approximately 72.5% when the LGP used in the light guide optical system has V-groove that is 3 millimeters wide and 3 millimeters deep on the LGP. In the example of FIG. 11, the total collected power is 2609.3 lm, the efficiency is 0.72481, and the maximum intensity is 741.84 cd.

Figure 12:
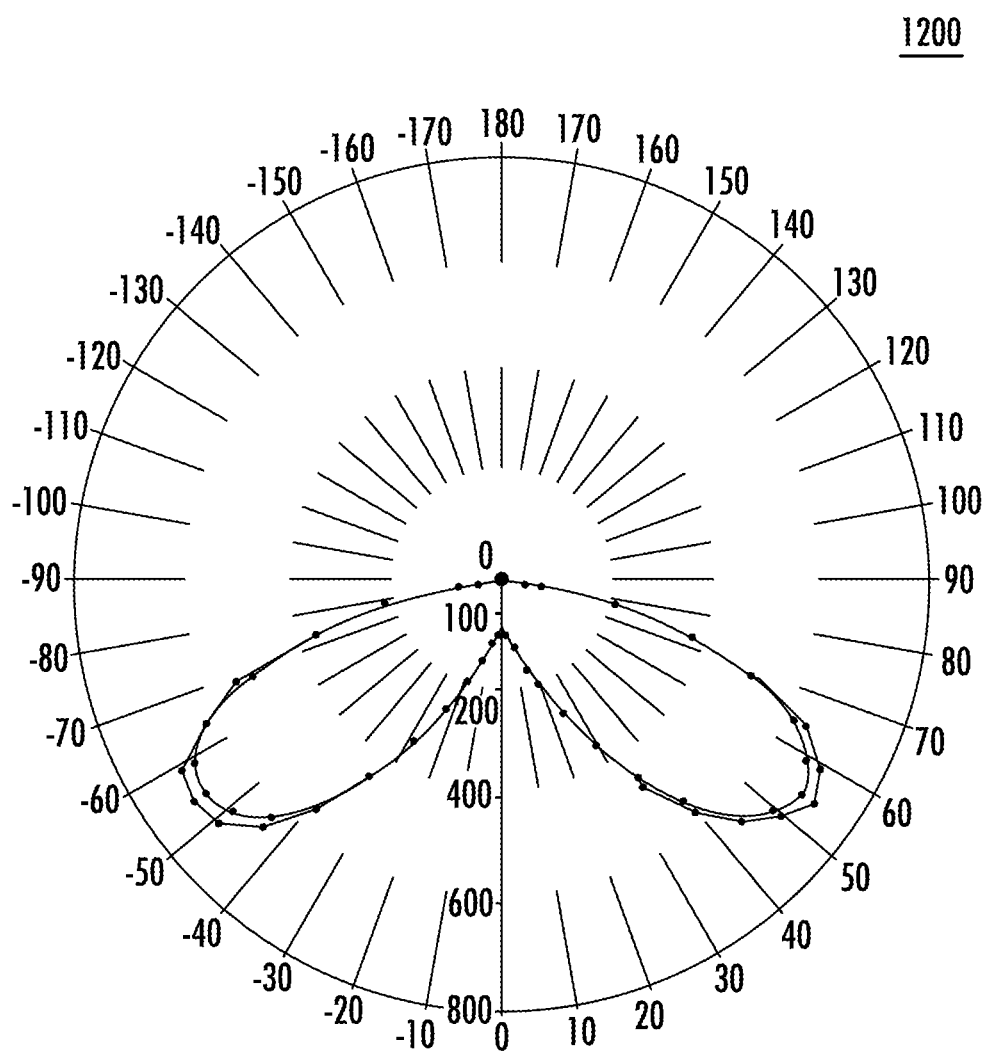
FIG. 12 is another diagram showing a light intensity and a light extraction efficiency when the LGP has a V-groove.

FIG. 12 is a diagram 1200 showing light intensity and a light extraction efficiency of approximately 70.1% when the LGP used in the light guide optical system has V-groove that is 3 millimeters wide and 1 millimeter deep on the LGP. In the example of FIG. 12, the total collected power is 2551.1 lm, the efficiency is 0.70863, and the maximum intensity is 724.14 cd.

Figure 13:
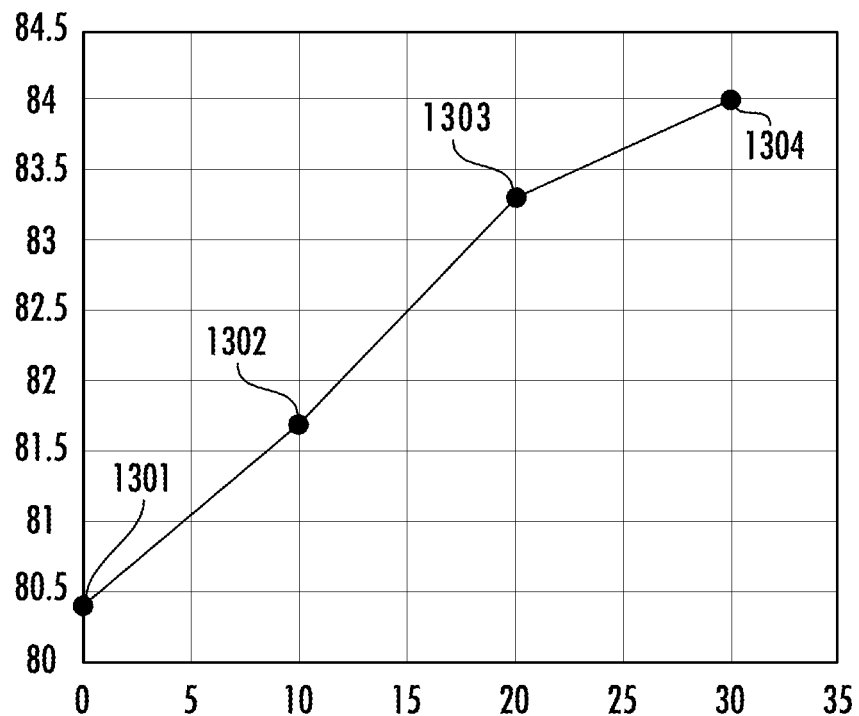
FIG. 13 is a diagram showing the improvement in light extraction efficiency versus the angle of the injection surface on the LGP.

FIG. 13 is a diagram 1300 showing the improvement in light extraction efficiency versus the angle of the injection surface on the LGP. FIG. 13 provides several examples of input facet angles of injection surfaces and the resulting light extraction efficiencies of those angles. In the example of FIG. 13, a 0 degree input angle results in an extraction efficiency of nearly 80.5% 1301. In another example, a 10 degree input angle improves extraction efficiency to over 81.5% 1302. In another example, a 20 degree input angle improves extraction efficiency to over 83% 1303. In another example, a 30 degree input angle improves extraction efficiency to approximately 84% 1303.

Figure 14:
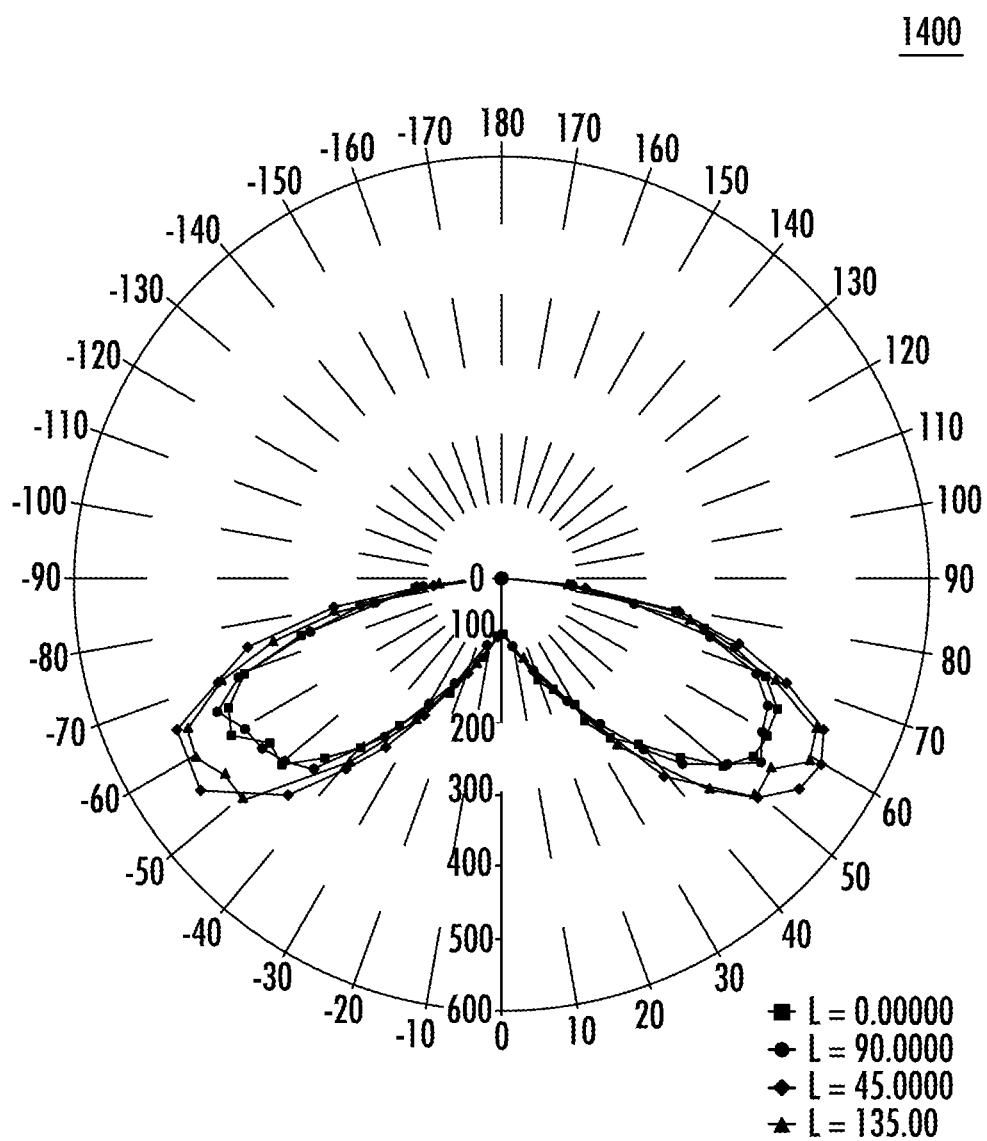
FIG. 14 is a diagram showing light intensity and light extraction efficiency the LGP used has normal facets.

FIG. 14 is a diagram 1400 showing light intensity and a light extraction efficiency of approximately 80.3% when the LGP used in the light guide optical system has normal facets. In the example of FIG. 14, the total collected power is 1929.2 lm, the efficiency is 0.80383, and the maximum intensity is 528.00 cd.

Figure 15:
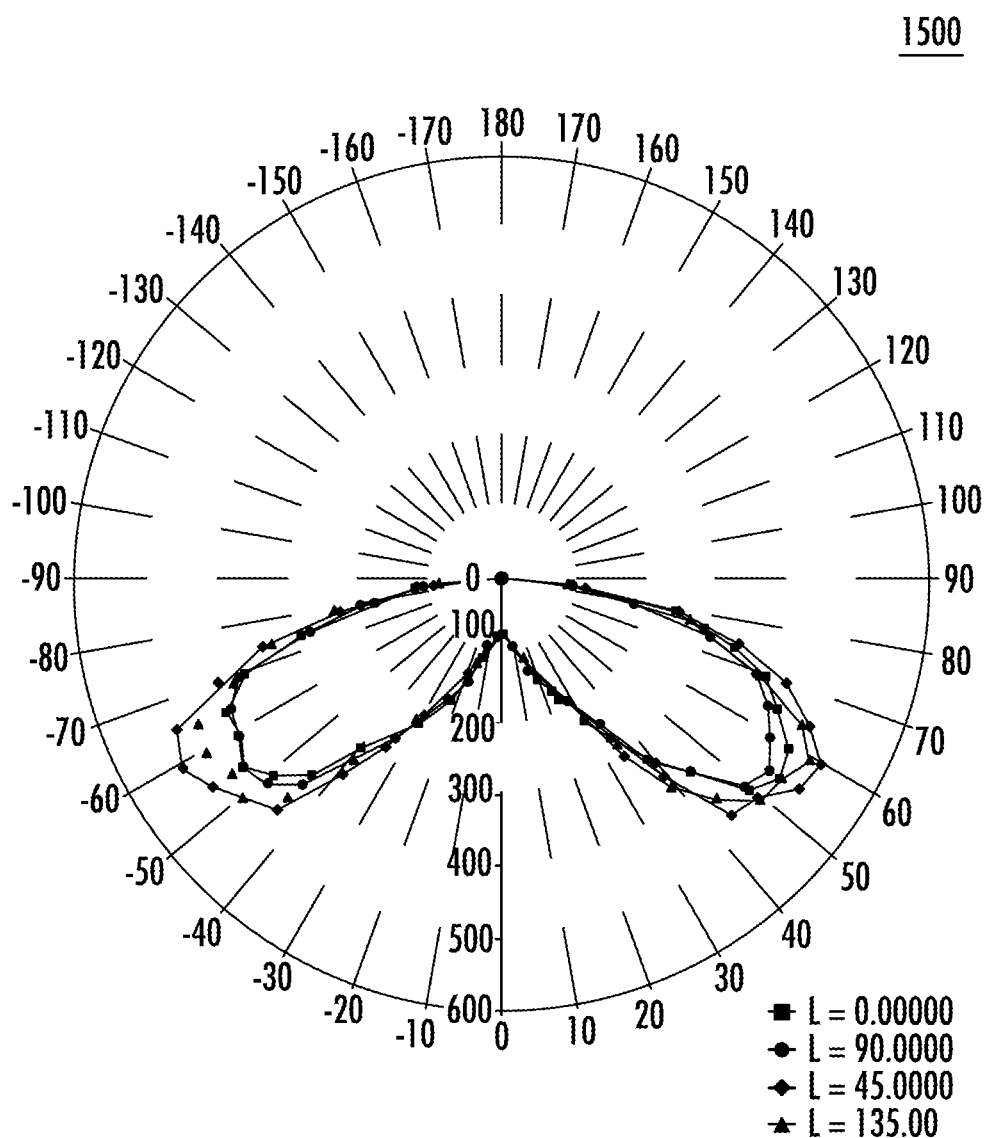
FIG. 15 is a diagram showing light intensity and light extraction efficiency when the LGP used has a 10 degree input angle of the injection surface.

FIG. 15 is a diagram 1500 showing light intensity and a light extraction efficiency of approximately 81.7% when the LGP used in the light guide optical system has a 10 degree input angle of the injection surface of the LGP. In the example of FIG. 15, the total collected power is 1960.9 lm, the efficiency is 0.81702, and the maximum intensity is 541.11 cd.

Figure 16:
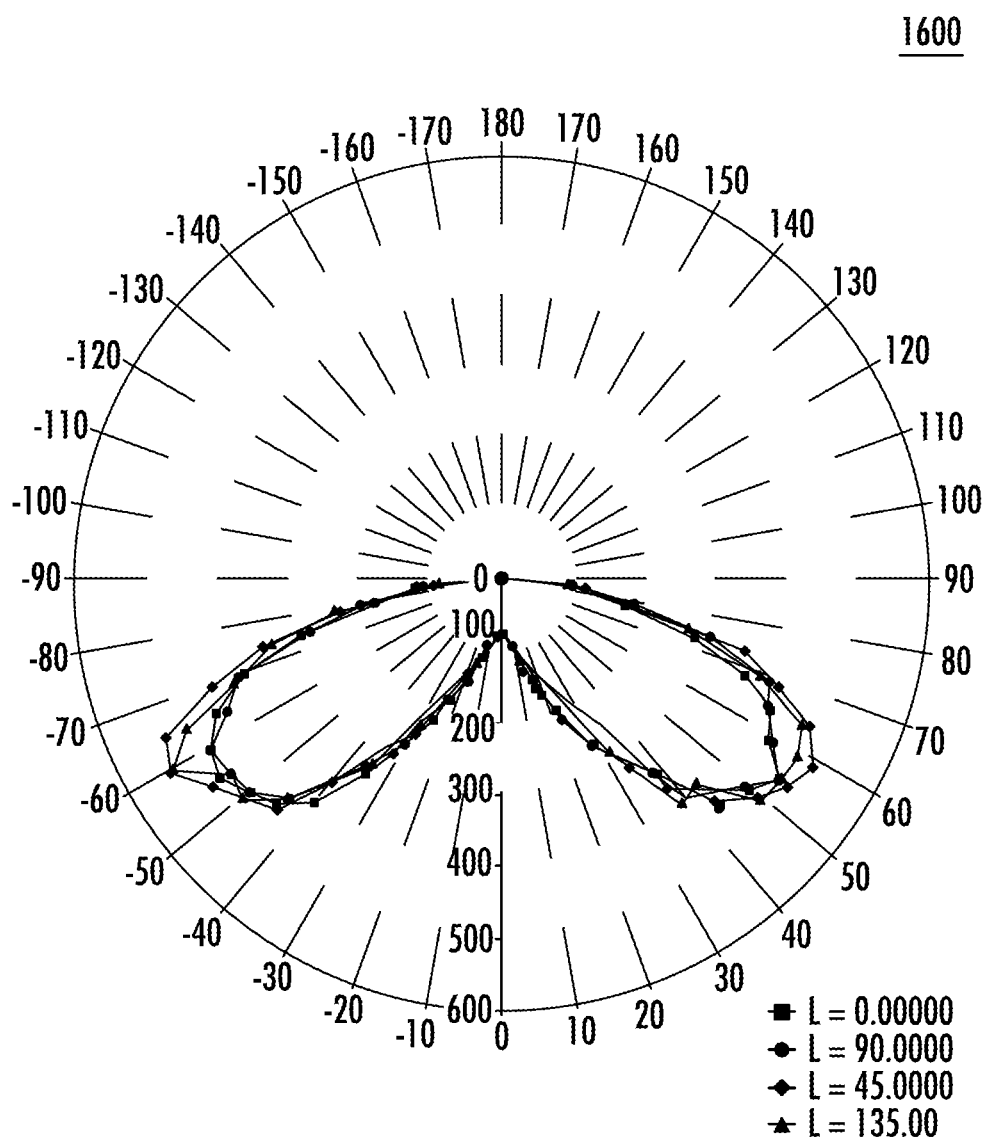
FIG. 16 is a diagram showing light intensity and light extraction efficiency when the LGP used has a 20 degree input angle of the injection surface.

FIG. 16 is a diagram 1600 showing light intensity and a light extraction efficiency of approximately 83.3% when the LGP used in the light guide optical system has a 20 degree input angle of the injection surface of the LGP. In the example of FIG. 16, the total collected power is 1998.3 lm, the efficiency is 0.83264, and the maximum intensity is 556.37 cd.

Figure 17:
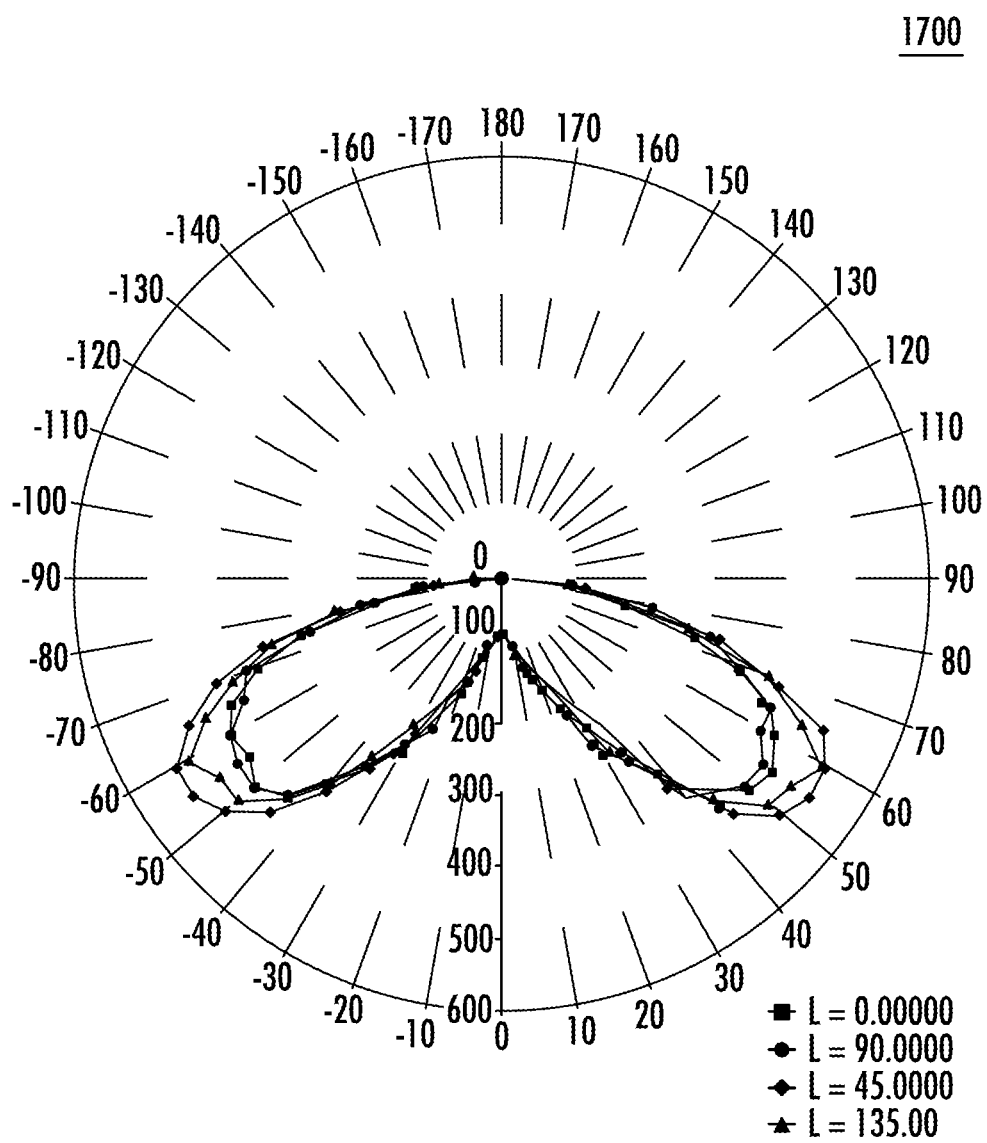
FIG. 17 is a diagram showing light intensity and light extraction efficiency when the LGP used has a 30 degree input angle of the injection surface.

FIG. 17 is a diagram 1700 showing light intensity and a light extraction efficiency of approximately 84% when the LGP used in the light guide optical system has a 30 degree input angle of the injection surface of the LGP. In the example of FIG. 17, the total collected power is 2016.5 lm, the efficiency is 0.84020, and the maximum intensity is 548.29 cd.

Figure 18:
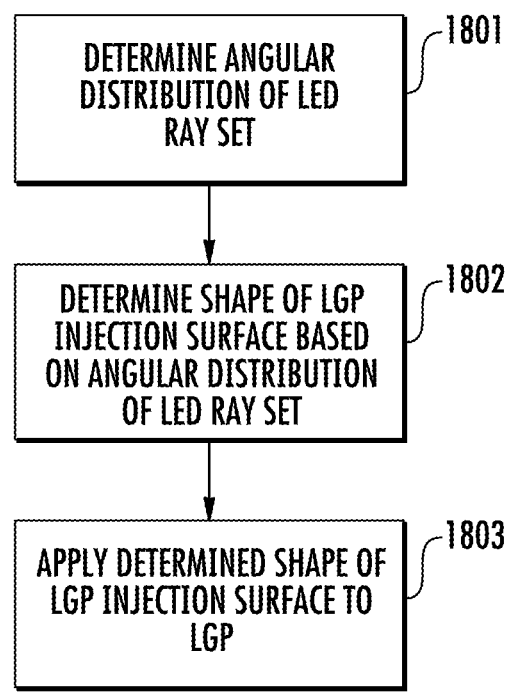
FIG. 18 is a flow diagram of an example process for use in a light guide optical system.

FIG. 18 is a flow diagram of an example process for use in a light guide optical system 1800 that may be used in combination with any of the embodiments described herein. While each step of the process 1800 in FIG. 18 is shown and described separately, multiple steps may be executed in a different order than what is shown, in parallel with each other, or concurrently with each other. Referring to FIG. 18, the angular distribution of the ray set of the LED, plurality of LEDs, or other light emitting source used in the light guide optical system is determined 1801. The shape of the injection surface of the LGP or other light guide is determined based on the angular distribution of the ray set of the LED or other light emitting source 1802. The determined shape of the LGP injection surface may then be applied to the LGP 1803. For example, the determined shape of the LGP injection surface may then be applied to the LGP using a manufacturing process that includes using a drill to create a shape or cavity in the relevant surfaces of the LGP in accordance with the examples described above.

As a result of the process 1800 in FIG. 18, light rays emitted by the LED, plurality of LEDs, or other light emitting source used in the light guide optical system are directed into the LGP or other light guide at angles sufficiently high as to induce TIR of the light rays on the light guiding surfaces and as a result increase the light extraction efficiency of the light. However, these angles are not excessively high such that they discontinue TIR on the guiding surfaces and instead leak outside undesirably.

Figure 19:
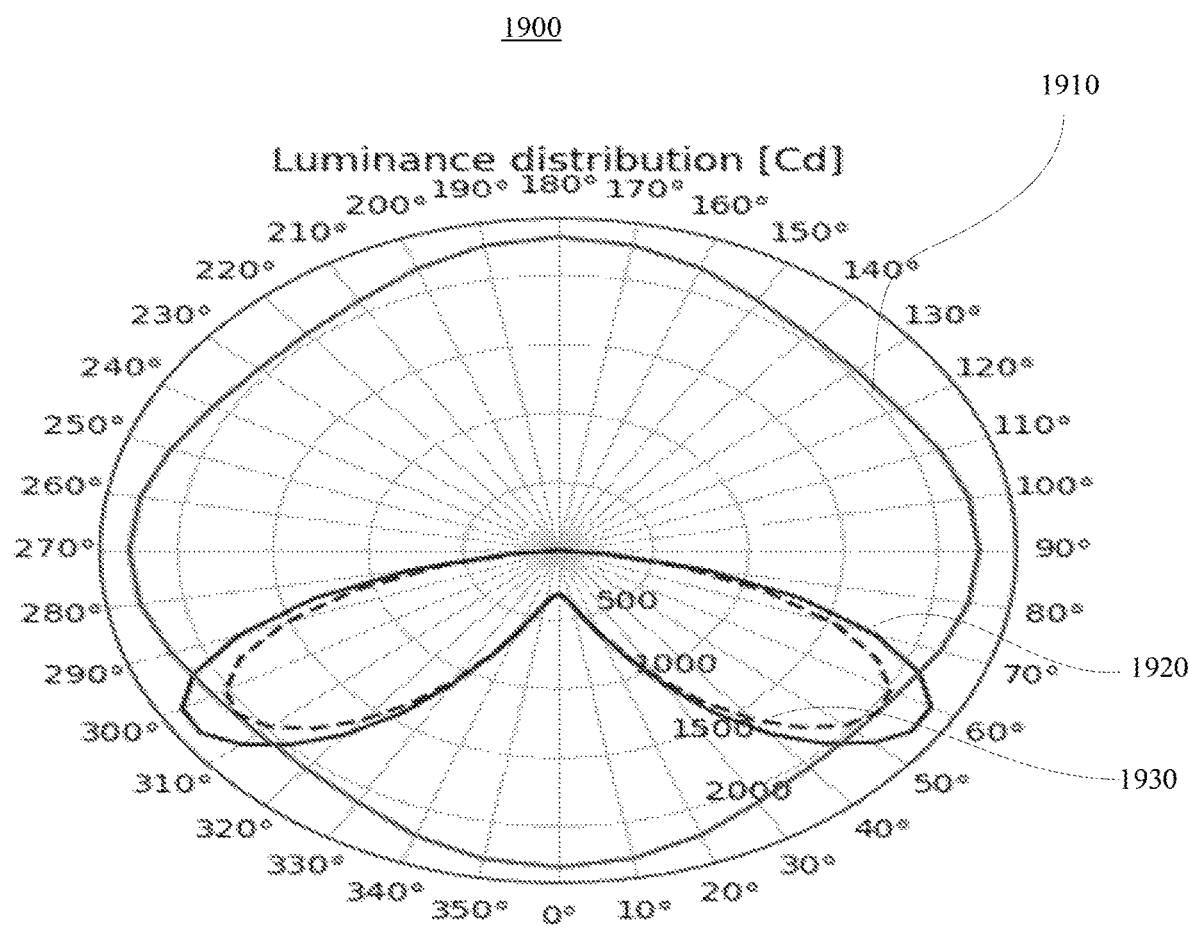
FIG. 19 is a diagram showing luminance distribution using non-shaped input surfaces.

FIG. 19 is a diagram 1900 showing luminance distribution when the LGP used in the light guide optical system has normal facets. In the example of FIG. 19, the curve 1910 shows an angular distribution in the horizontal plane intersecting the peak luminance and 1920 and 1930 show the light intensity and light extraction efficiency.

Figure 20:
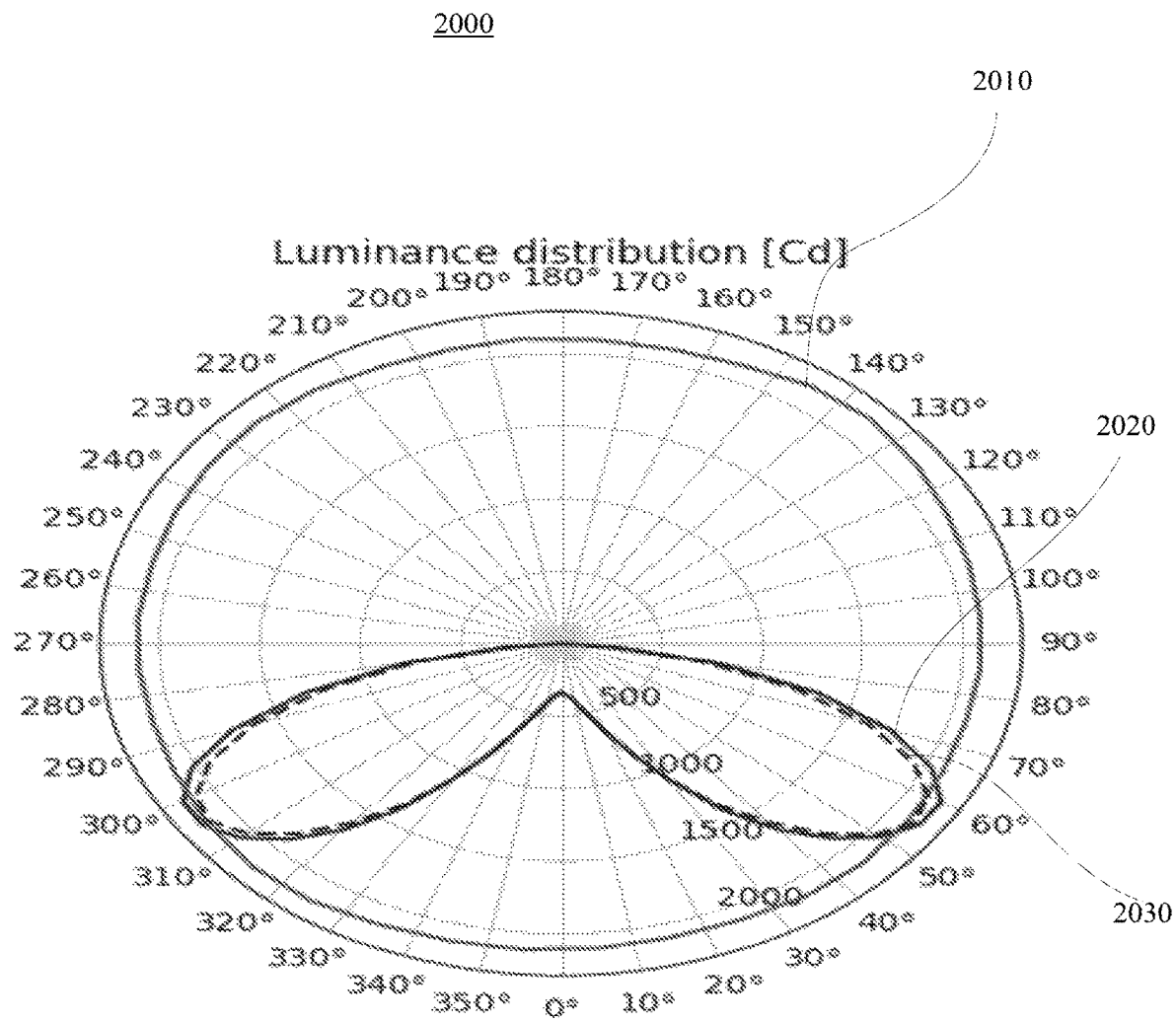
FIG. 20 is a diagram showing luminance distribution using shaped input surfaces.

FIG. 20 is a diagram 2000 showing luminance distribution when the LGP used in the light guide optical system of FIG. 19 has shaped input surfaces. In the example of FIG. 20, the curve 2010 shows an angular distribution in the horizontal plane intersecting the peak luminance which is more uniform than that of 1910 in FIG. 19. FIG. 20 also includes 2020 and 2030 which show the light intensity and light extraction efficiency which is more uniform than 1920 and 1930 of FIG. 19, respectively.

Having thus described various embodiments, it is to be appreciated and will be apparent to those skilled in the art that many physical changes, only a few of which are exemplified in the detailed description above, may be made in the methods and apparatuses described herein without altering the inventive concepts and principles embodied herein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

Although features and elements are described above in particular combinations, it is to be appreciated that each feature or element can be used alone or in any combination with or without the other features and elements. Any single embodiment described herein may be supplemented with one or more elements from any one or more of the other embodiments described herein. Any single element of an embodiment may be replaced with one or more elements from any one or more of the other embodiments described herein. For example, each feature or element as described herein with reference to any one of FIGS. 1-20 may be used alone without the other features and elements or in various combinations with or without other features and elements from each or any combinations of the other figures from FIGS. 1-20. Sub-elements of the methods and apparatuses described herein with reference to FIGS. 1-20 may be performed in any arbitrary order (including concurrently) in any combination or sub-combination.

What is claimed is:
1. A light guide optical system comprising:
   a light-emitting element;
   a light guide plate (LGP), the LGP including light extraction features including one of a texture and a dot pattern and located on a first major surface of the LGP, the LGP further including a second major surface opposing the first major surface and input surfaces, the input surfaces including a shaped injection surface and extending from the first major surface to the second major surface; and the shaped injection surface contoured to deviate light emitted from the light-emitting element toward and near-parallel to the first and second major surfaces to cause the light emitted from the light-emitting element to be incident on the light extraction features.

2. The light guide optical system of claim 1, wherein the shaped injection surface is a split edge and the first and second major surfaces are rectilinear.

3. The light guide optical system of claim 2, wherein the split edge includes a "v" shape with the vertex of the "v" situated on the shaped injection surface about halfway between the first and second major surfaces and extending away from an opposing input surface of the input surfaces towards the first and second major surfaces.

4. The light guide optical system of claim 2, wherein the split edge creates an input angle of 10, 20, or 30 degrees.

5. The light guide optical system of claim 1, wherein the shaped injection surface is a curved edge and the first and second major surfaces are rectilinear.

6. The light guide optical system of claim 1, wherein the shaped injection surface includes convex contours, relative to the light-emitting element, that meet about halfway between the first major surface and the second major surface.

7. The light guide optical system of claim 1, wherein the shaped injection surface includes a bell curve shape with respective tails extending toward the first and second major surfaces, respectively.

8. The light guide optical system of claim 1, wherein light rays emitted by the light-emitting cross the shaped injection surface and are directed into the first and second surfaces of the LGP at angles sufficiently high as to induce total internal reflection (TIR) of the light rays.

9. The light guide optical system of claim 1, wherein light rays emitted by the light-emitting element do not propagate in the LGP at excessively high angles causing them to not be extracted by the light extraction features.

10. The light guide optical system of claim 1, wherein the shaped injection surface is angled to avoid inducing angles that are too high such that light rays emitted by the light-emitting element do not induce total internal reflection (TIR).

11. The light guide optical system of claim 1, wherein the shaped injection surface on the input surface of the LGP is contoured based on a distance of the light-emitting element to the LGP input surface.

12. A method for use in a light guide optical system, the method comprising:
determining an angular distribution of a ray set of a light-emitting element of the light guide optical system;
determining a shape of an injection surface of a light guide plate (LGP) used in the light guide optical system based on the angular distribution of the ray set of the light-emitting element, the light guide plate including light extraction features, selected from one of a texture and a dot pattern, located on a first major surface of the LGP, the LGP further including a second major surface opposing the first major surface and input surfaces, the input surfaces including an injection surface and extending from the first major surface to the second major surface; and
applying the determined shape of the injection surface to the LGP to deviate light emitted from the light-emitting element toward and near-parallel to the first and second major surfaces to cause the light emitted from the light-emitting element to be extracted from the LGP via the light extraction features.

13. The method of claim 12, wherein the applying includes using a manufacturing process that includes using a drill to create a shape in the LGP.

14. The method of claim 12, wherein the shape of the injection surface is a split edge and the first and second major surfaces are rectilinear.

15. The method of claim 12, wherein the shape of the injection surface is a curved edge and the first and second major surfaces are rectilinear.

16. The method of claim 12, wherein the injection surface includes convex contours, relative to the light-emitting element, that meet about halfway between the first and second major surfaces.

17. A light guide plate (LGP) comprising:
light extraction features selected from one of a texture and a dot pattern and located on a first major surface of the LGP;
a second major surface opposing the first major surface; and
input surfaces extending between the first and second major surfaces, the input surfaces including a shaped injection surface, the shaped injection surface contoured to deviate light emitted from a light source towards and near-parallel to the first and second major surfaces to cause the light emitted from the light source to be extracted from the LGP via the light extraction features.

18. The LGP of claim 17, wherein the shaped injection surface is a split edge and the first and second major surfaces are rectilinear.

19. The LGP of claim 17, wherein the shaped injection surface is a curved edge and the first and second major surfaces are rectilinear.

20. The LGP of claim 17, wherein the shaped injection surface includes convex contours, relative to the light element, that meet about halfway between the first major surface and the second major surface.

* * * * *